H. J. GOSLEE.
CROWN PIN FOR DENTAL WORK.
APPLICATION FILED JAN. 21, 1913.

1,189,808.

Patented July 4, 1916.

Witnesses:—
Hyperion Barry
F. George Barry,

Inventor:—
Hart J. Goslee
by his attorneys
Brown & Seward

UNITED STATES PATENT OFFICE.

HART J. GOSLEE, OF CHICAGO, ILLINOIS, ASSIGNOR TO CONSOLIDATED DENTAL MANUFACTURING COMPANY, OF NEW YORK, N. Y., A CORPORATION OF NEW YORK.

CROWN-PIN FOR DENTAL WORK.

1,189,808.   Specification of Letters Patent.   Patented July 4, 1916.

Application filed January 21, 1913. Serial No. 743,343.

*To all whom it may concern:*

Be it known that I, HART J. GOSLEE, a citizen of the United States, and resident of Chicago, in the county of Cook and State of Illinois, have invented a new and useful Improvement in Crown-Pins for Dental Work, of which the following is a specification.

My invention relates to crown pins for dental work, with the object in view of providing the pin with means for permitting it to be interlocked with the backing for the crown in addition to the securing of the pin thereto by adhesion, as is now common. By interlocking the tooth crown pin and its backing, I am enabled to insure a better and more permanent attachment of the backing to the crown.

My invention comprises the provision of an enlarged portion on the pin and a recess at the outer or inner sides of said enlarged portion or recesses at both sides thereof, as desired, into which recess or recesses the backing extends for interlocking it to the pin.

Figure 1:
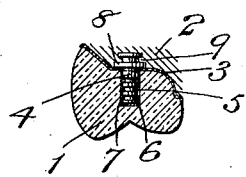
Figure 2:
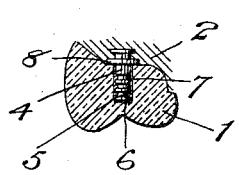
Figure 3:
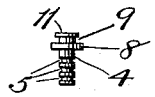
Figure 4:
Figure 5:
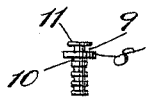

In the accompanying drawings, Figure 1 is a section on an enlarged scale through an artificial tooth crown and its backing, including a backing plate and my improved pin, Fig. 2 is a similar view with the backing plate eliminated, Fig. 3 is a detail view in side elevation of the pin itself, in which the recess is formed at the outer side of the enlarged portion, Fig. 4 is a view of a modified form of pin in which the recess is located at the inner side of the enlarged portion, and Fig. 5 is a similar view of a third form of pin in which the recesses are formed at both the outer and inner sides of the enlarged portion.

The artificial tooth crown is denoted by 1, and the back by 2. In the form shown in Fig. 1 a backing plate 3 is interposed between the backing 2 and the base of the tooth crown. The tooth crown pin is denoted by 4 and it may be provided with the usual indentations 5 for use in securing the pin within the socket 6 of the tooth crown 1, by cement 7. This pin 4 is provided with an enlarged portion 8. In the form shown in Figs. 1, 2 and 3 the pin is provided with a backing interlocking recess 9 at the outer side of the enlarged portion 8. In Fig. 4 a backing interlocking recess 10 is formed at the inner side of the enlarged portion 8 and in Fig. 5 the recesses 9 and 10 are shown at both the outer and inner sides of the said enlarged portion.

In the form shown in Figs. 3 and 5 the end of the pin adjacent to the recess 9 is shown as being provided with a slightly enlarged head 11.

In practice, the backing 2 for the tooth crown is allowed to flow into the recess 9 or 10 or both of said recesses in the pin, thus securing the backing to the pin by an interlocked engagement as well as by adhesion alone.

What I claim is:—

1. A tooth crown pin having an enlarged portion and an annular backing interlocking recess in the pin and at the outer side of the base of the enlarged portion.

2. A tooth crown pin having an enlarged portion and an annular backing interlocking recess in the pin and at the inner side of the base of the enlarged portion.

3. A tooth crown pin having an enlarged portion and annular backing interlocking recesses in the pin and at the outer and inner sides of the base of the enlarged portion.

In testimony, that I claim the foregoing as my invention, I have signed my name in presence of two witnesses, this sixth day of January, 1913.

HART J. GOSLEE.

Witnesses:
C. H. BRAMWELL,
L. MARSHALL.